US012536665B2

(12) United States Patent
Shin et al.

(10) Patent No.: US 12,536,665 B2
(45) Date of Patent: Jan. 27, 2026

(54) OBJECT DETECTION METHOD AND DEVICE USING MULTIPLE AREA DETECTION

(71) Applicant: MAY-I INC., Seoul (KR)

(72) Inventors: In Sik Shin, Seoul (KR); Jun Hyuk Park, Seoul (KR); Jin Woo Park, Incheon (KR)

(73) Assignee: MAY-I INC., Seoul (KR)

( * ) Notice: Subject to any disclaimer, the term of this patent is extended or adjusted under 35 U.S.C. 154(b) by 751 days.

(21) Appl. No.: 17/769,379

(22) PCT Filed: Oct. 5, 2020

(86) PCT No.: PCT/KR2020/013506
§ 371 (c)(1),
(2) Date: Jul. 10, 2023

(87) PCT Pub. No.: WO2021/075772
PCT Pub. Date: Apr. 22, 2021

(65) Prior Publication Data
US 2023/0386043 A1 Nov. 30, 2023

(30) Foreign Application Priority Data

Oct. 18, 2019 (KR) .......................... 10-2019-0129707

(51) Int. Cl.
*G06T 7/11* (2017.01)

(52) U.S. Cl.
CPC ............ *G06T 7/11* (2017.01); *G06T 2210/12* (2013.01)

(58) Field of Classification Search
CPC ....... G06T 7/11; G06T 2210/12; G06T 7/187; G06V 20/52
See application file for complete search history.

(56) References Cited

U.S. PATENT DOCUMENTS

2013/0230217 A1* 9/2013 Ueki ................... G06V 40/103
382/118
2019/0050694 A1* 2/2019 Fukagai ................ G06V 20/10

FOREIGN PATENT DOCUMENTS

JP          5569990 B2    8/2014
JP      2016126624 A     7/2016
(Continued)

OTHER PUBLICATIONS

International Search Report of PCT/KR2020/013506 dated Jan. 8, 2021.

*Primary Examiner* — Wassim Mahrouka
(74) *Attorney, Agent, or Firm* — Dinsmore & Shohl LLP; Yongsok Choi, Esq.

(57) ABSTRACT

An object detection method is provided. The method includes the steps of: acquiring a plurality of frame images; detecting a first bounding box of a first object and a second bounding box of a second object from a first frame image; assigning a first identification value to the first bounding box and a second identification value to the second bounding box; generating a virtual bounding box of the first object in a second frame image; assigning the first identification value to a third bounding box of the first object detected from the second frame image, on the basis of a size of an area where the third bounding box overlaps the virtual bounding box; and changing the second identification value to the first identification value on the basis of a size of an area where the first bounding box overlaps the second bounding box.

7 Claims, 9 Drawing Sheets

(56) References Cited

FOREIGN PATENT DOCUMENTS

| | | | |
|---|---|---|---|
| JP | 2019036008 | A | 3/2019 |
| KR | 1020180097944 | A | 9/2018 |
| WO | 2012053311 | A1 | 4/2012 |

* cited by examiner

FIG. 4A	FIG. 4B	FIG. 4C
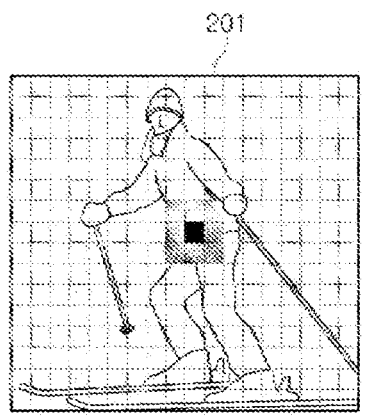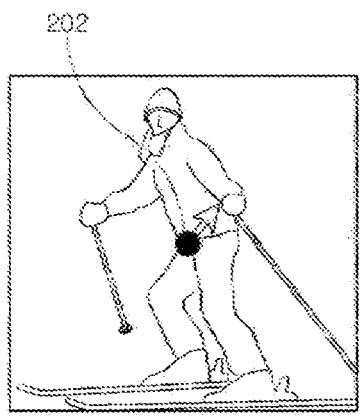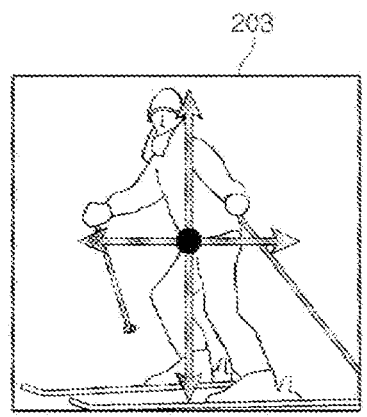
FIG. 5
```
{
    frame id : [[x1, y1, x2, y2] ...],
    ...
}
```

FIG. 6A
FIG. 6B
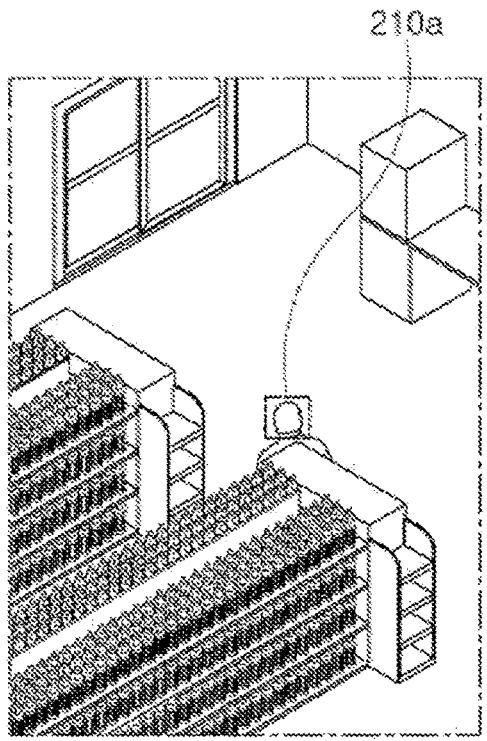
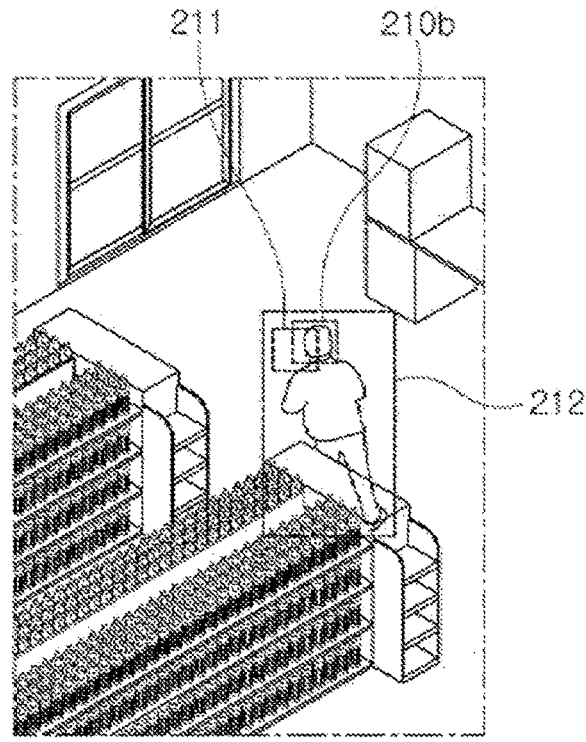
FIG. 7
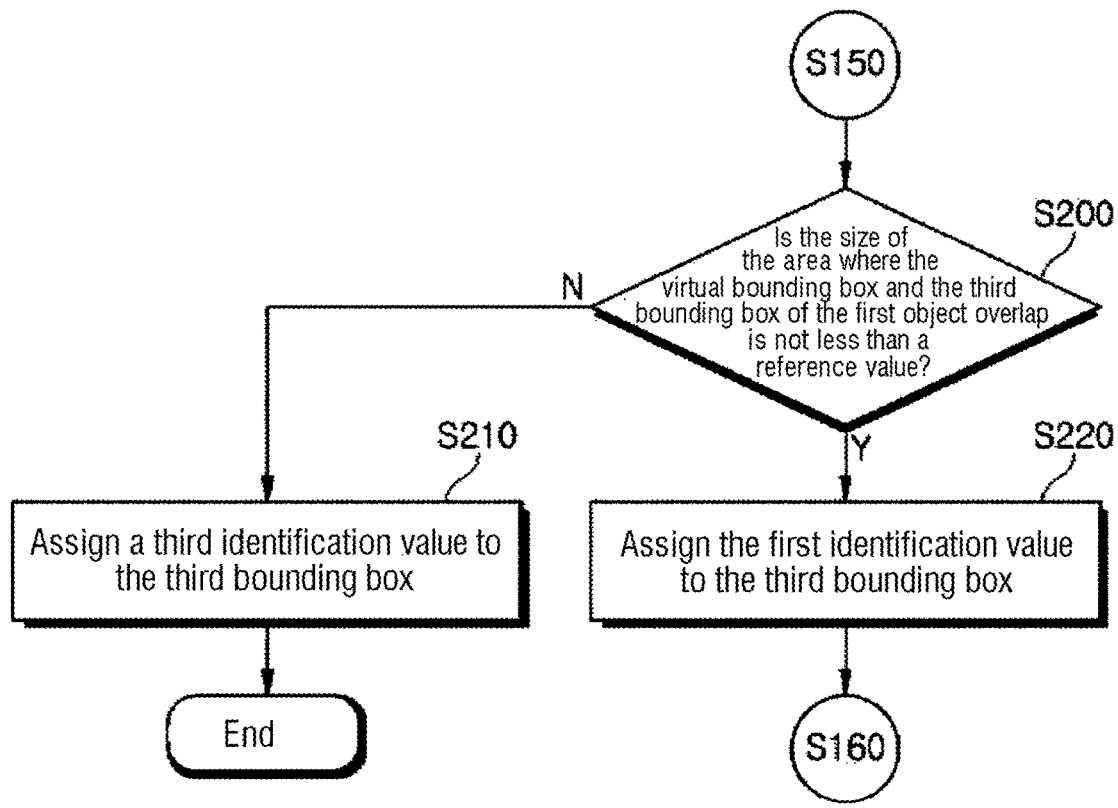

FIG. 13

```
Algorithm 1 link Body to Head
 1: procedure LINK_BODY_TO_HEAD
 2:     for A ← all bodies do
 3:         for B ← head that has appeared in the same frame do
 4:             r ← ratio of frames where A is contained in B to frames containing B
 5:             if r < 0.05 then
 6:                 list_head.append(B)
 7:             end if
 8:         end for
 9:         sort list_head in descending order of r
10:         for B ∈ list_head do
11:             for C ← body linked to B do
12:                 if Ratio(A in C) < 0.9 and Ratio(C in A) < 0.9 then
13:                     ID of A ← ID of B
14:                     goto CheckComplete
15:                 end for
16:             end for
17:         end for
18:         :CheckComplete
19:     end for
20: end procedure
21:
22: procedure RATIO(a in b)
23:     all_count ← 0
24:     coexist_count ← 0
25:     for frame ∈ b do
26:         all_count + = 1
27:         if frame ∈ a then
28:             coexist_count + = 1
29:         end if
30:     end for
31:     return coexist_count / all_count
32: end procedure
```

OBJECT DETECTION METHOD AND DEVICE USING MULTIPLE AREA DETECTION

CROSS-REFERENCE TO RELATED APPLICATION(S)

This application is a continuation application of Patent Cooperation Treaty (PCT) International Application No. PCT/KR2020/013506 filed on Oct. 5, 2020, which claims priority to Korean Patent Application No. 10-2019-0129707 filed on Oct. 18, 2019. The entire contents of PCT International Application No. PCT/KR2020/013506 and Korean Patent Application No. 10-2019-0129707 are hereby incorporated by reference.

FIELD OF THE INVENTION

The present invention relates to an object detection method and apparatus using detection of multiple areas of an object.

BACKGROUND

Techniques for detecting a person from a video in real time are utilized in various fields related to security, sensing systems, intelligent robots, and the like. A person object may be detected from each of a plurality of frame images included in a video using various image processing techniques. However, it is not easy to determine the identity of the person detected from the plurality of frame images. In particular, a single person object may be detected as a plurality of person objects when all or part of the person object is impaired depending on video capture angles or various structures.

Therefore, there is a need for a technique capable of accurately identifying the identity of a person object from a plurality of frame images included in a video.

SUMMARY OF THE INVENTION

Embodiments of the present invention provide a method and apparatus for identically recognizing an object in a plurality of frame images even if a part of the object is not captured in some of the frame images.

An object detection method according to one embodiment of the invention may comprise the steps of: acquiring a plurality of frame images; detecting a first bounding box of a first object and a second bounding box of a second object from a first frame image; assigning a first identification value to the first bounding box, and assigning a second identification value to the second bounding box; generating a virtual bounding box of the first object in a second frame image; assigning the first identification value to a third bounding box of the first object detected from the second frame image, on the basis of a size of an area where the third bounding box overlaps the virtual bounding box; and changing the second identification value to the first identification value on the basis of a size of an area where the first bounding box overlaps the second bounding box.

According to one embodiment of the invention, the step of detecting the first bounding box and the second bounding box comprises the step of acquiring vertex coordinates of the first bounding box using center coordinates, a horizontal length, and a vertical length of the first bounding box, and acquiring vertex coordinates of the second bounding box using center coordinates, a horizontal length, and a vertical length of the second bounding box.

According to one embodiment of the invention, the step of generating of the virtual bounding box comprises the step of generating a first virtual bounding box on the basis of the first bounding box, and mapping the first virtual bounding box to the third bounding box.

According to one embodiment of the invention, the step of mapping the first virtual bounding box to the third bounding box comprises the steps of: generating a second virtual bounding box in a third frame image in response to not detecting the third bounding box; and mapping the second virtual bounding box to a fourth bounding box of the first object detected from the third frame image, and the step of assigning the first identification value to the third bounding box comprises the step of assigning the first identification value to the fourth bounding box of the first object detected from the third frame image, on the basis of a size of an area where the fourth bounding box overlaps the second virtual bounding box.

According to one embodiment of the invention, the step of assigning the first identification value to the third bounding box comprises the step of assigning the first identification value to the third bounding box in response to determining that the size of the area where the third bounding box overlaps the virtual bounding box is not less than a reference value.

According to one embodiment of the invention, the step of changing the second identification value to the first identification value comprises the step of changing the second identification value to the first identification value in response to determining that the size of the area where the first bounding box overlaps the second bounding box is not less than a reference value.

According to one embodiment of the invention, the step of detecting the second bounding box comprises the step of detecting a fifth bounding box of a third object, the step of assigning the second identification value to the second bounding box comprises the step of assigning a third identification value to the fifth bounding box, and the step of changing the second identification value to the first identification value comprises the step of changing the third identification value to the first identification value in response to determining that an area where the first bounding box overlaps the fifth bounding box is larger than the area where the first bounding box overlaps the second bounding box.

An object detection apparatus according to another embodiment of the invention comprises a processor that may be configured to: acquire a plurality of frame images; detect a first bounding box of a first object and a second bounding box of a second object from a first frame image; assign a first identification value to the first bounding box, and assign a second identification value to the second bounding box; generate a virtual bounding box of the first object in a second frame image; assign the first identification value to a third bounding box of the first object detected from the second frame image, on the basis of a size of an area where the third bounding box overlaps the virtual bounding box; and change the second identification value to the first identification value on the basis of a size of an area where the first bounding box overlaps the second bounding box.

BRIEF DESCRIPTION OF THE DRAWINGS

FIG. 4A illustrates how to generate a bounding box according to one embodiment of the invention.

FIG. 4B illustrates how to generate a bounding box according to one embodiment of the invention.

FIG. 4C illustrates how to generate a bounding box according to one embodiment of the invention.

FIG. 5 illustrates how to generate a bounding box according to one embodiment of the invention.

FIG. 6A illustrates a plurality of bounding boxes generated for a single object according to one embodiment of the invention.

FIG. 6B illustrates a plurality of bounding boxes generated for a single object according to one embodiment of the invention.

FIG. 7 specifically illustrates some of the steps shown in FIG. 3.

FIG. 13 illustrates an algorithm for assigning identification values to a plurality of bounding boxes according to one embodiment of the invention.

DETAILED DESCRIPTION

Figure 1:
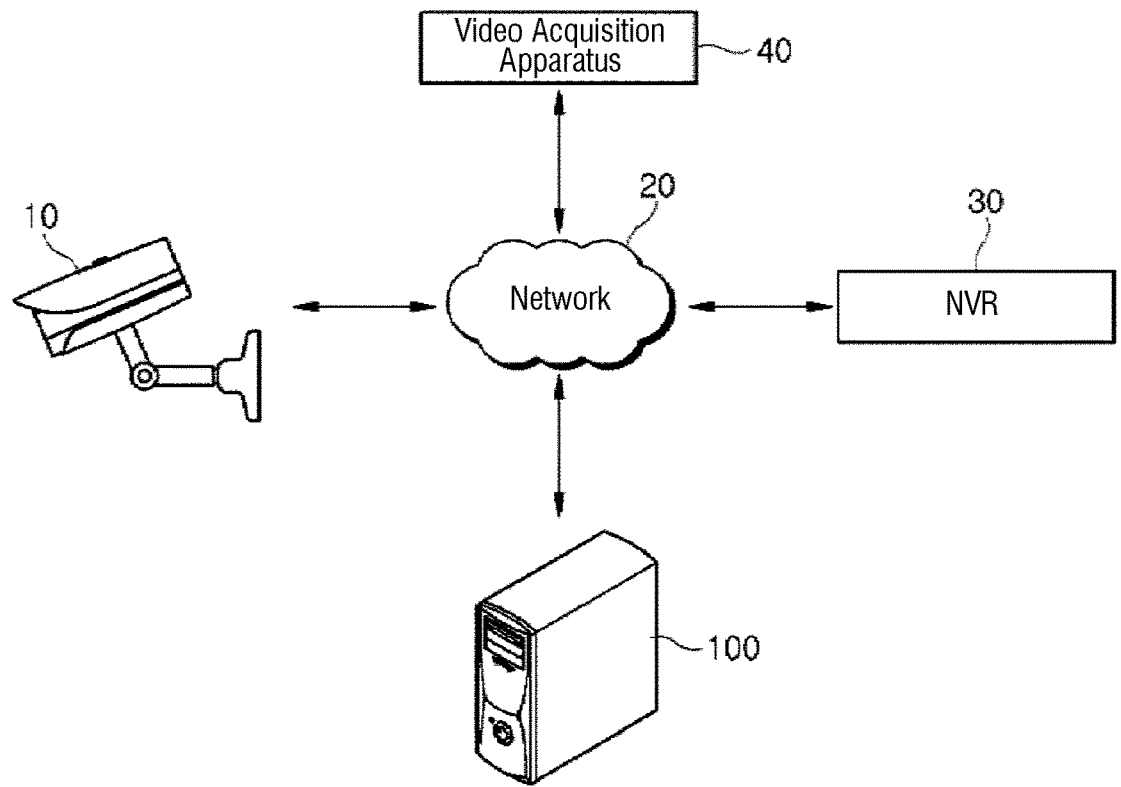
FIG. 1 shows an example of an object detection system comprising an object detection apparatus according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various embodiments of the present invention will be described in detail with reference to the accompanying drawings to enable those skilled in the art to easily implement the invention.

FIG. 1 shows an example of an object detection system comprising an object detection apparatus according to one embodiment of the invention.

According to one embodiment of the invention, a video captured by a camera 10 may be transferred to an NVR 30 and a video acquisition apparatus 40 via a network 20. In addition, the video acquired by the video acquisition apparatus 40 may be transferred to an object detection apparatus 100 according to one embodiment of the invention. In this case, the video acquisition apparatus 40 and the object detection apparatus 100 may transmit and receive data via the network 20.

According to another embodiment of the invention, the video acquisition apparatus 40 may be a hardware module embedded in the object detection apparatus 100, or a software module executed on the object detection apparatus 100. In this case, the object detection apparatus 100 may directly acquire the video captured by the camera 10 via the network 20. Further, according to one embodiment of the invention, the object detection apparatus 100 may include a camera module to directly capture a video.

According to one embodiment of the invention, the object detection apparatus 100 may acquire a plurality of frame images included in the video, and may detect bounding boxes corresponding to a plurality of objects from a first frame image. Further, the object detection apparatus 100 may assign an identification value to each bounding box, and may assign the same identification value to a plurality of bounding boxes corresponding to a single object. Thus, an object detection method to be described below may be performed for a plurality of bounding boxes to which different identification values are assigned according to one embodiment of the invention, so that the same identification value may be assigned to one or more bounding boxes corresponding to a single object.

According to one embodiment of the invention, the bounding box may correspond to an area of the detected object. For example, when a first object is a person's head, a bounding box corresponding to the first object may correspond to an area of the person's head. When a second object is a person's body, a bounding box corresponding to the second object may correspond to an area of the person's body.

According to one embodiment of the invention, the above-described identification value may be data for identifying each object. For example, the same identification value may be assigned to a bounding box of a specific person object detected from the first frame image and a bounding box of the person object detected from a second frame image. Further, when a plurality of bounding boxes corresponding to a plurality of areas of the person object are detected from the first frame image, the same identification value may be assigned to all of the plurality of bounding boxes. A specific manner of detecting an object by assigning an identification value to a bounding box will be described below with reference to FIGS. 3 to 13.

Figure 2:
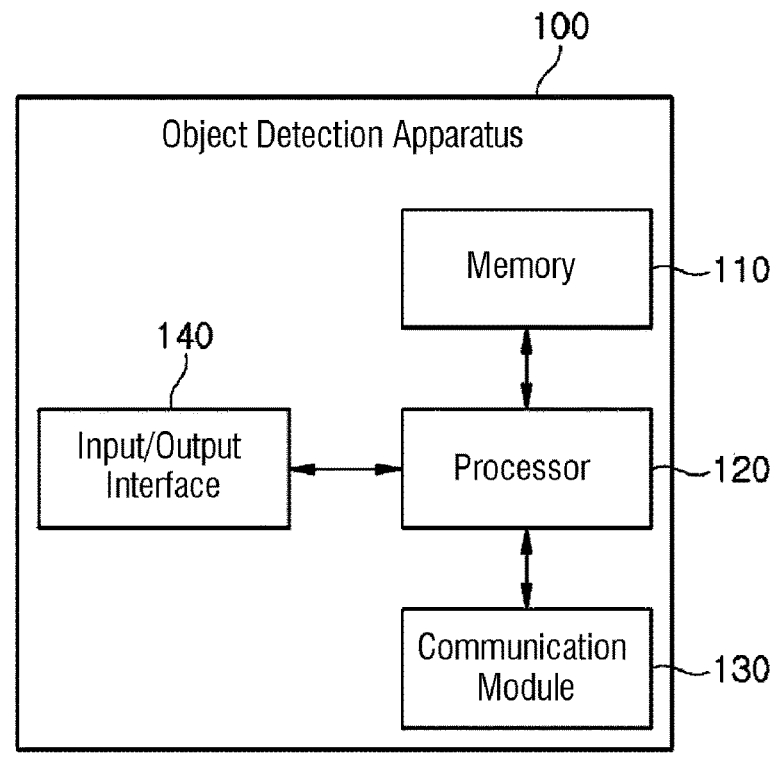
FIG. 2 illustrates the configuration and operations of an object detection apparatus according to one embodiment of the invention.

FIG. 2 illustrates the configuration and operations of an object detection apparatus according to one embodiment of the invention.

According to one embodiment of the invention, the object detection apparatus 100 may comprise an input/output interface 140, a memory 110, a processor 120, and a communication module 130. The memory 110 may be a computer-readable recording medium, and may include random access memory (RAM), read only memory (ROM), and a permanent mass storage device such as a disk drive. Further, the memory 110 may store program codes and settings for controlling the object detection apparatus 100, a plurality of frame images, and data and identification value information of bounding boxes.

The processor 120 may be configured to process instructions of a computer program by executing basic arithmetic, logic, and input/output operations. The instructions may be provided to the processor 120 by the memory 110 or the communication module 130. For example, the processor 120 may be configured to execute received instructions according to program codes stored in a storage device (e.g., the memory 110).

The communication module 130 may function to communicate with the camera, the video acquisition apparatus, or an external server via the network. As an example, a request generated by the processor 120 of the object detection apparatus 100 according to program codes stored in a storage device (e.g., the memory 110) may be transferred to the external server via the network under the control of the communication module 130. In contrast, the object detection apparatus 100 may receive control signals or commands, contents, files, or the like, which are provided under the control of a processor of the external server, via the network through the communication module 130. For example, the control signals or commands of the external server received through the communication module 130 may be transferred to the processor 120 or the memory 110, and the contents, the files, or a database may be stored in a storage medium, which may be further provided in the object detection apparatus 100.

Further, although a communication scheme of the communication module 130 is not particularly limited, the network may be a local area wireless communication network. For example, the network may be a Bluetooth, Bluetooth Low Energy (BLE), or WiFi communication network.

The input/output interface 140 may receive a user's input and display output data. The input/output interface 140 according to one embodiment of the invention may display a received video on a display, and may display a bounding box corresponding to a detected object on the display in an overlay manner.

In addition, according to other embodiments of the invention, the object detection apparatus 100 may further include other components than the components illustrated in FIG. 2. However, most of conventional components need not be explicitly illustrated. For example, the object detection apparatus 100 may include a battery and a charging device for supplying power to internal components of the object detection apparatus 100. Alternatively, the object detection apparatus 100 may be implemented to include at least some of the above-described input/output devices, or may further include other components such as a transceiver, a global positioning system (GPS) module, various sensors, and a database.

Further, although not illustrated in FIG. 2, one or more camera modules may be further included in the object detection apparatus 100. According to one embodiment of the invention, the object detection apparatus 100 may acquire a plurality of frame images using images captured by the camera modules.

Figure 3:
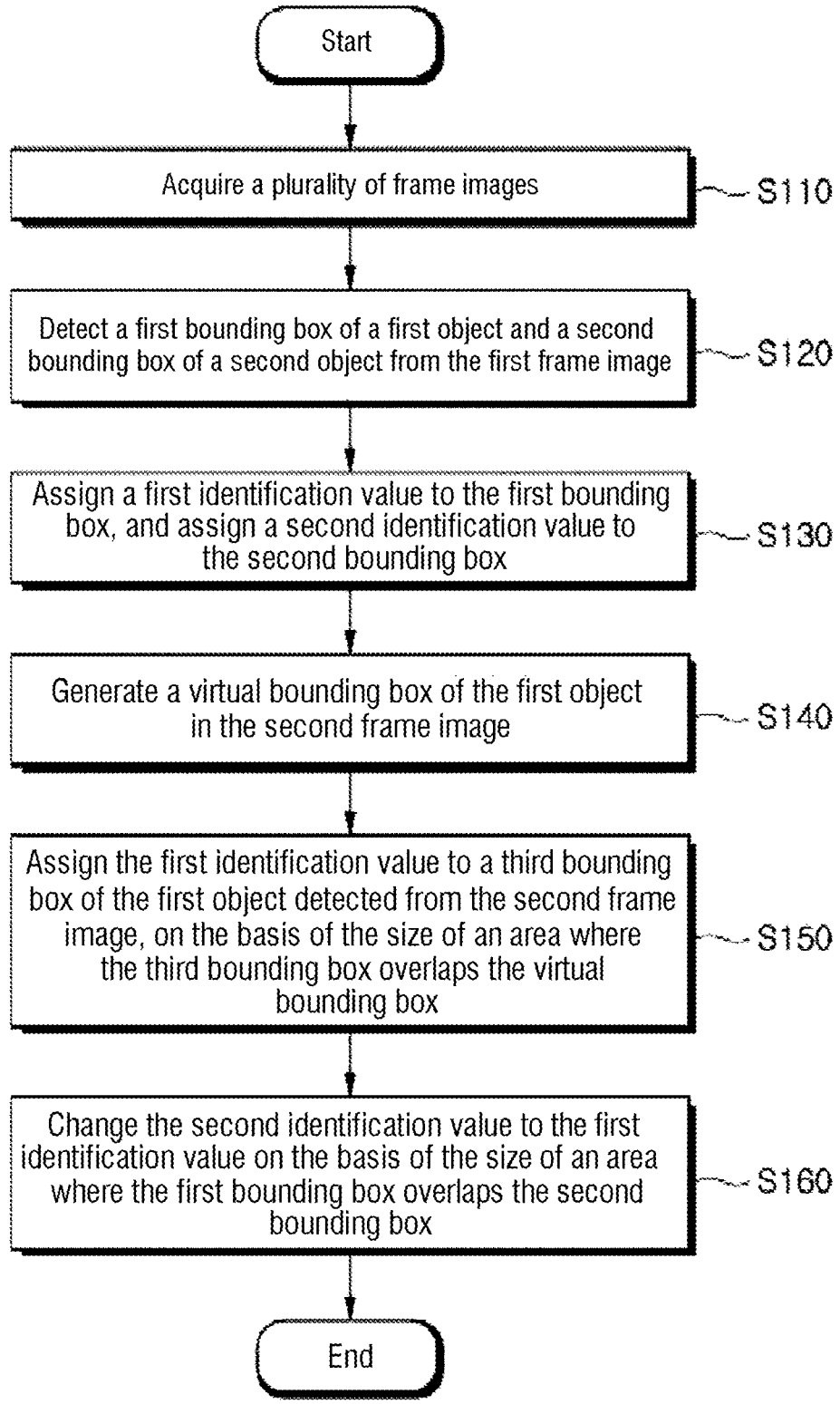
FIG. 3 is a flowchart of an object detection method according to one embodiment of the invention.

FIG. 3 is a flowchart of an object detection method according to one embodiment of the invention.

According to one embodiment of the invention, the object detection apparatus may acquire a plurality of frame images (S110). The plurality of frame images are acquired from a video on a frame basis, and may be sequentially acquired over time. Thus, the description will be made on the assumption that a first frame image to a third frame image to be described below are sequentially acquired from a single video unless otherwise specified.

According to one embodiment of the invention, the object detection apparatus may detect a first bounding box of a first object and a second bounding box of a second object from the first frame image (S120). According to one embodiment of the invention, when the object detection apparatus detects a person object, both the first object and the second object may correspond to some areas of the same person object. According to one embodiment of the invention, the first object may be a head of the person and the second object may be a body of the person.

As described above, the bounding boxes may correspond to areas where the objects are detected. Thus, according to one embodiment of the invention, the first bounding box may correspond to the head area of the person and the second bounding box may correspond to the body area of the person.

According to one embodiment of the invention, the bounding box may be stored using coordinates of each vertex. The shape of the bounding box is not particularly limited. For example, when the bounding box has a rectangular shape, data of the bounding box may be stored using coordinates of four vertexes. Further, the vertex coordinates of the bounding box may be relative coordinates in the frame image.

According to one embodiment of the invention, the object detection apparatus may assign a first identification value to the first bounding box, and assign a second identification value to the second bounding box (S130). The object detection apparatus may initially assign different identification values to the bounding boxes of the detected objects. According to one embodiment of the invention, even when a bounding box corresponding to a person's head and a bounding box corresponding to a person's body are detected, they may not correspond to the head and body of the same person. Thus, different identification values may be initially assigned to the respective bounding boxes.

According to one embodiment of the invention, the object detection apparatus may generate a virtual bounding box of the first object in the second frame image (S140). The object detection apparatus may estimate a position of the virtual bounding box of the first object in the second frame image on the basis of a position of the first bounding box of the first object in the first frame image. According to one embodiment of the invention, the object detection apparatus may estimate the position of the virtual bounding box of the first object using a Kalman filter. The virtual bounding box may be mapped to one of bounding boxes detected from the second frame image on the basis of the size of an area where the virtual bounding box overlaps each of the bounding boxes.

According to one embodiment of the invention, when a bounding box corresponding to the virtual bounding box is not detected from the second frame image, a bounding box detected from the third frame image may be mapped to the virtual bounding box. The following description will be made on the assumption that a third bounding box detected from the second frame image is mapped to the virtual bounding box.

According to one embodiment of the invention, the object detection apparatus may assign the first identification value to the third bounding box of the first object detected from the second frame image, on the basis of the size of an area where the third bounding box overlaps the virtual bounding box (S150). According to one embodiment of the invention, when the size of the area where the third bounding box overlaps the virtual bounding box is not less than a reference value, the object detection apparatus may assign the first identification value to the third bounding box. In this case, it is highly probable that the third bounding box is a bounding box of the first object, and thus the identification value equal to that of the first bounding box of the first object may be assigned to the third bounding box by the object detection apparatus.

According to one embodiment of the invention, the object detection apparatus may change the second identification value to the first identification value on the basis of the size of an area where the first bounding box overlaps the second bounding box (S160). According to one embodiment of the invention, when the first bounding box corresponds to a person's head area and the second bounding box corresponds to a person's body area, the first bounding box and the second bounding box are generated for the areas of the same person object, and thus the same identification value needs to be assigned to the first bounding box and the second bounding box. Therefore, according to the embodiment of the invention, the object detection apparatus may unify different identification values assigned to bounding boxes of a single object.

Specific procedures for the respective steps will be described in detail below.

FIGS. 4A to 4C and 5 illustrate how to generate a bounding box according to one embodiment of the invention.

Referring to FIG. 4A, the object detection apparatus may divide an object area included in a frame image by a specified unit to form a grid 201. Then, the object detection apparatus may acquire a cell corresponding to a center point 202 of the object. For example, the object detection apparatus may acquire a cell corresponding to the center of the person's head area, or acquire a cell corresponding to the center of the person's body area. In this case, it should be noted that the center point 202 of the object acquired as illustrated in FIG. 4B is not the actual center of the object because the center point 202 corresponds to the center of the object area in the frame image.

Thereafter, the object detection apparatus may perform a regression analysis to estimate the actual size of the object, thereby generating a bounding box 203 corresponding to the object area using the size of the object and the corrected center point of the object, as illustrated in FIG. 4C. The shape of the bounding box is not particularly limited. According to one embodiment of the invention, when the generated bounding box 203 has a rectangular shape, the object detection apparatus may acquire information on vertex coordinates of the bounding box using the size of the object and the corrected center point of the object as described above.

FIG. 5 illustrates an example of a data format of a bounding box according to one embodiment.

According to one embodiment of the invention, when the center coordinates (x, y) of an object included in a frame image and the horizontal length and vertical length (w, h) of the object are acquired, the coordinates (x1, y1), (x2, y2) of the upper left and lower right vertexes or the upper right and lower left vertexes of the bounding box may be acquired. In this case, bounding box data 301 included in the frame image may be illustrated as in FIG. 5.

FIGS. 6A and 6B illustrate a plurality of bounding boxes generated for a single object according to one embodiment of the invention. Hereinafter, a manner of detecting a plurality of areas of a single object will be described in detail with reference to FIGS. 6A and 6B.

The object detection apparatus according to some embodiments of the invention may detect a person, and more specifically, may independently detect the head and body of a person. When various parts of a person are independently detected in order to eventually detect a single person object, a moving person object may be stably tracked even if some areas of the person are hidden by a structure or another object.

For example, in a case in which a person's body needs to be detected in order to detect a person object, it is impossible to detect the person object when the person's body is hidden by a structure in a frame image as illustrated in FIG. 6A. In contrast, in a case in which various parts of a person are independently detected according to some embodiments of the invention, it is possible to detect the person object even if only the person's head area is detected.

In particular, even if only a head object 210a of a person is detected from the first frame image, the object detection method according to some embodiments of the invention may update a constant of an object detection filter using bounding box information of the case in which a head 210b and a body 212 of the person are simultaneously detected from the second frame image. This increases the accuracy of the object detection.

Hereinafter, it will be described how to detect a person's head object when the object detection apparatus detects each of the person's head and body in order to detect a person object according to one embodiment of the invention.

According to one embodiment of the invention, an object tracking apparatus assigns a tracker to the head object 210a of the person detected from the first frame image illustrated in FIG. 6A. Any type of tracker that may be selected by those skilled in the art may be used as the tracker, and a Kalman filter-based tracker may preferably be used. Hereinafter, for the clarity of description, it is assumed that the object is detected using the Kalman filter-based tracker. The tracking of the person's body may also be performed in the same manner as above.

Referring to the second frame image illustrated in FIG. 6B, a virtual bounding box 211 of a first object in the second frame image may be generated using the Kalman filter. When the size of an area where the generated virtual bounding box 211 overlaps a third bounding box 210b of the first object detected from the second frame image is not less than a reference value, the object detection apparatus may map the virtual bounding box 211 to the third bounding box 210b, and determine that the first object is detected. Further, the Kalman filter that detects the first object may be updated using the third bounding box 210b.

According to one embodiment of the invention, when the virtual bounding box 211 is not mapped to the third bounding box 210b, the object detection apparatus may further generate a second virtual bounding box of the first object in a third frame image. The maximum number of frame images from which virtual bounding boxes are generated is not particularly limited. According to one embodiment of the invention, the object detection apparatus may generate virtual bounding boxes from up to thirty frame images in order to restrict memory usage. However, it should be noted that the maximum number of frame images is not necessarily limited to thirty.

According to one embodiment of the invention, the Kalman filter-based tracker may be assigned to each of one or more objects detected from the first frame image. Thus, all the above-described steps may be performed for each of the one or more objects detected from the first frame image.

The case in which the virtual bounding box is not mapped to the third bounding box according to one embodiment of the invention will be described in detail with reference to FIG. 7.

According to one embodiment of the invention, the object detection apparatus may check whether the size of the area where the virtual bounding box and the third bounding box of the first object overlap is not less than a reference value (S200).

According to one embodiment of the invention, when the size of the area where the virtual bounding box and the third bounding box of the first object overlap is not less than the reference value, the object detection apparatus may assign the first identification value to the third bounding box (S220).

In contrast, according to one embodiment of the invention, when the size of the area where the virtual bounding box and the third bounding box of the first object overlap is less than the reference value, it is highly probable that the third bounding box does not correspond to the first object. Thus, the object detection apparatus may assign a third identification value, which is different from the identification value of the first object, to the third bounding box (S210).

When bounding boxes corresponding to the detected objects are generated for each of the plurality of frame images as described above, data of the bounding boxes may be generated on the basis of a variety of information.

Figure 8:
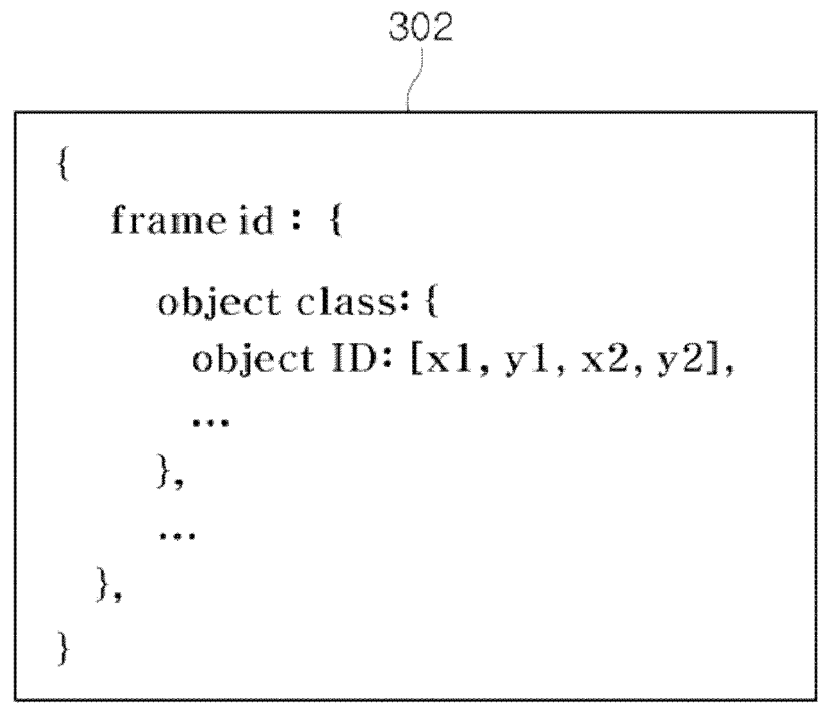
FIG. 8 illustrates a data format of a bounding box to which an identification value is assigned according to one embodiment of the invention.
Figure 9:
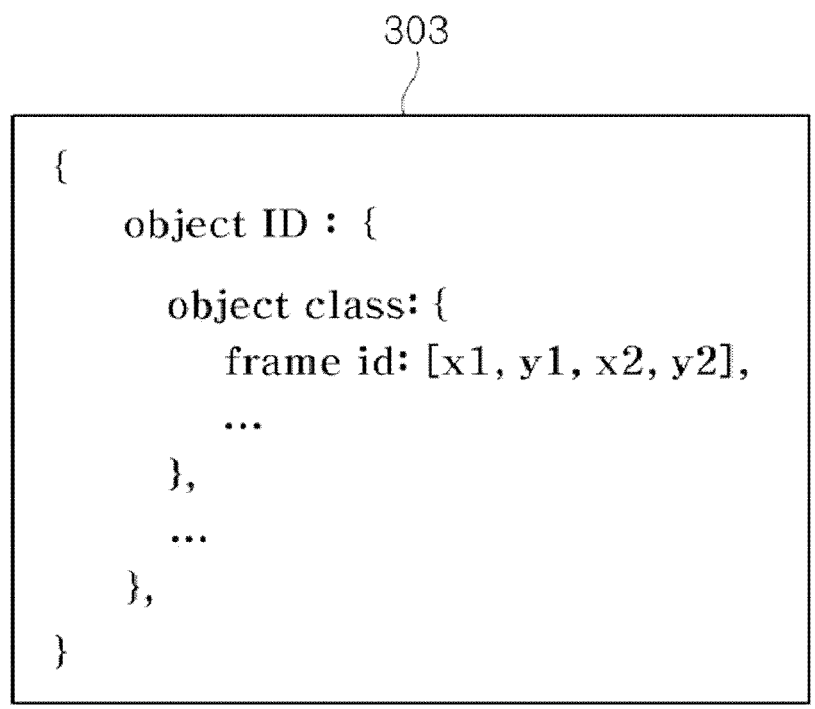
FIG. 9 illustrates a data format of a bounding box to which an identification value is assigned according to one embodiment of the invention.

FIGS. 8 and 9 illustrate an example of a data format related to an object and a bounding box according to one embodiment of the invention.

For example, as illustrated in FIG. 8, data 302 of the bounding box may be generated with respect to each frame image. As illustrated in FIG. 9, data 303 of the bounding box may be generated with respect to an identification value of each object.

As described above, the object detection apparatus may detect an object from each of a plurality of frame images and track the object detected from each of the plurality of frame images, and then may unify identification values of bounding boxes corresponding to a plurality of areas independently tracked for a single object. That is, when the object detection apparatus independently detects and tracks the head and body of the same person, identification values corresponding to the head and body of the same person should be unified.

By combining results of independently detecting and tracking the head and body in the above manner, it is possible to detect the object even if the tracking is difficult since the person is hidden, overlapped, or the like. In particular, the person's head is less likely to be hidden at a capturing angle of a closed-circuit television (CCTV), and thus it is possible to acquire robust object detection results by detecting and tracking the head even if a portion of the body is hidden or overlapped.

Figure 10:
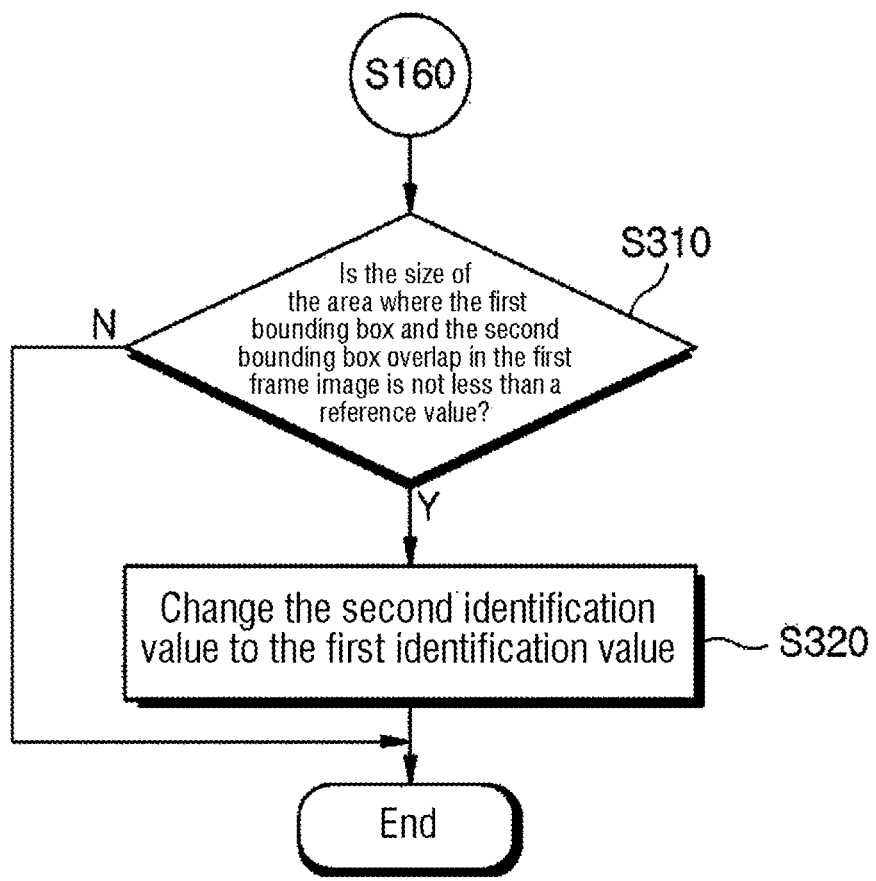
FIG. 10 specifically illustrates some of the steps shown in FIG. 3.

FIG. 10 specifically illustrates some of the steps shown in FIG. 3.

According to one embodiment of the invention, the object detection apparatus may check whether the size of the area where the first bounding box and the second bounding box overlap in the first frame image is not less than a reference value (S310). According to one embodiment of the invention, the first bounding box may correspond to a person's head area and the second bounding box may correspond to a person's body area.

According to one embodiment of the invention, when the size of the area where the first bounding box and the second bounding box overlap is less than the reference value, the person's head corresponding to the first bounding box and the person's body corresponding to the second bounding box may not correspond to those of the same person. In this case, the object detection apparatus may not change the second identification value assigned to the second bounding box.

According to one embodiment of the invention, when the size of the area where the first bounding box and the second bounding box overlap is not less than the reference value, the person's head corresponding to the first bounding box and the person's body corresponding to the second bounding box may correspond to those of the same person. In this case, the object detection apparatus may change the second identification value assigned to the second bounding box to the first identification value assigned to the first bounding box (S320).

Figure 11:
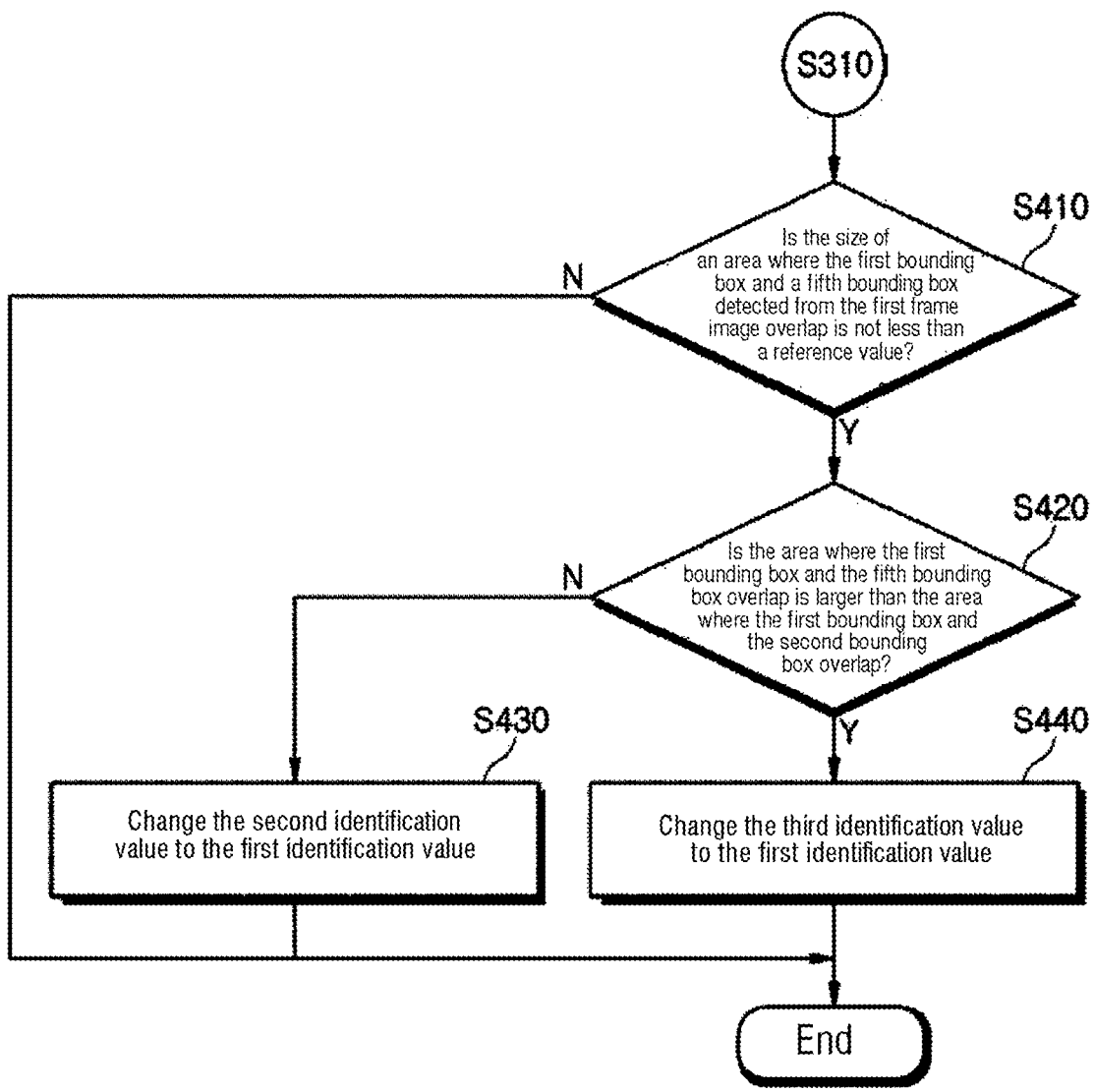
FIG. 11 specifically illustrates some of the steps shown in FIG. 10.

Next, it will be described with reference to FIG. 11 how to assign an identification value to each of bounding boxes when there is a large number of areas where the bounding boxes overlap.

In the following description, it is assumed that a first bounding box, a second bounding box, and a fifth bounding box are detected from the first frame image, and that a first identification value is assigned to the first bounding box, a second identification value is assigned to the second bounding box, and a third identification value is assigned to the fifth bounding box.

Even if the size of the area where the first bounding box corresponding to the head area and the second bounding box corresponding to the body area overlap in the first frame image is not less than the reference value in the step S310 of FIG. 10, the object detection apparatus may perform the step S410 to be described below when there is a bounding box that overlaps the first bounding box and corresponds to another body area.

According to one embodiment of the invention, the object detection apparatus may check whether the size of an area where the first bounding box and the fifth bounding box detected from the first frame image overlap is not less than a reference value (S410).

According to one embodiment of the invention, when the size of the area where the first bounding box and the fifth bounding box detected from the first frame image overlap is not less than the reference value, the object detection apparatus may check whether the area where the first bounding box and the fifth bounding box overlap is larger than the area where the first bounding box and the second bounding box overlap (S420).

According to one embodiment of the invention, when the area where the first bounding box and the fifth bounding box overlap is larger than the area where the first bounding box and the second bounding box overlap, it is highly probable that the head corresponding to the first bounding box and the body corresponding to the fifth bounding box correspond to those of the same person. Thus, the object detection apparatus may change the third identification value assigned to the fifth bounding box to the first identification value assigned to the first bounding box (S440).

In contrast, according to one embodiment of the invention, when the area where the first bounding box and the second bounding box overlap is larger than the area where the first bounding box and the fifth bounding box overlap, it is highly probable that the head corresponding to the first bounding box and the body corresponding to the second bounding box correspond to those of the same person. Thus, the object detection apparatus may change the second identification value assigned to the second bounding box to the first identification value assigned to the first bounding box (S430).

Next, it will be described in detail with reference to FIG. 12 how to assign an identification value to a bounding box for each of the head and body as described above.

Figure 12:
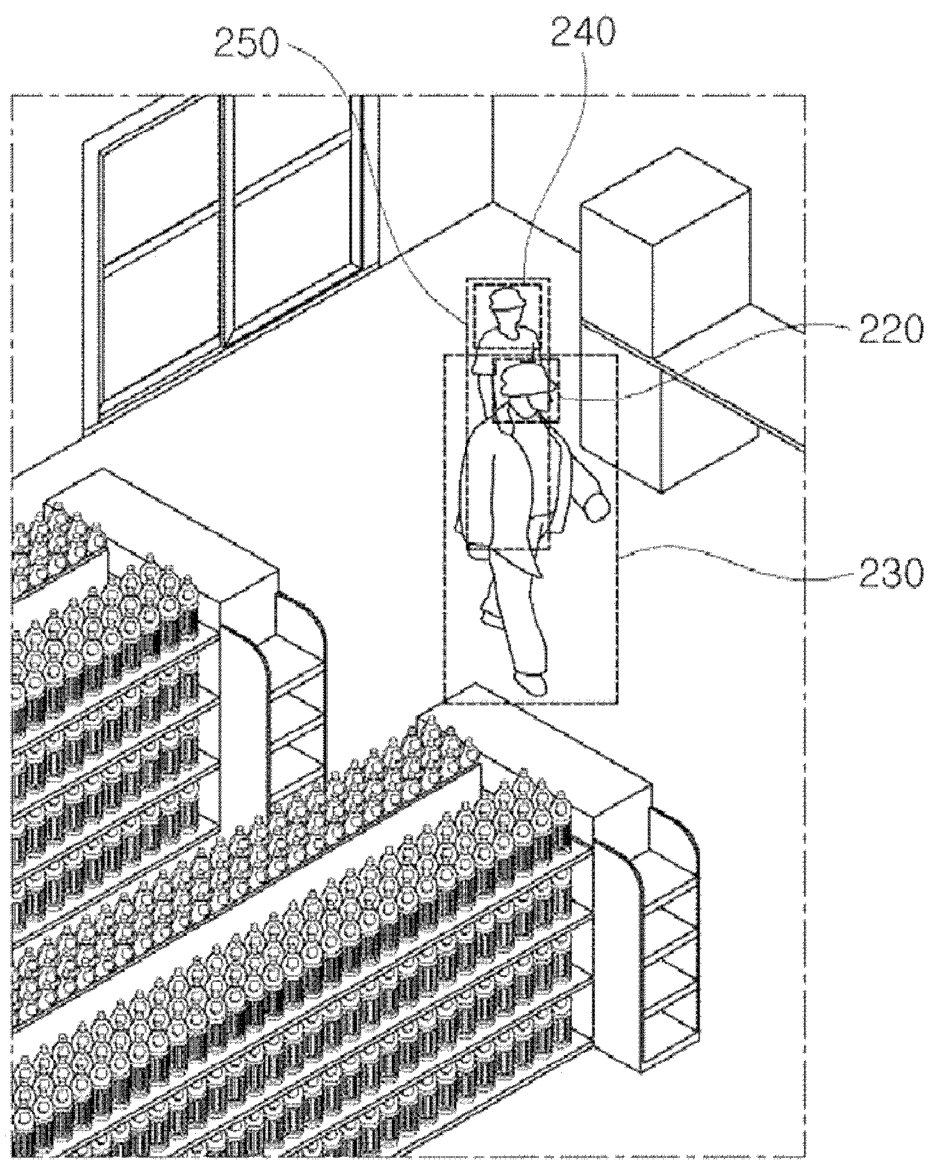
FIG. 12 illustrates how to assign identification values to bounding boxes for a plurality of objects according to one embodiment of the invention.

With respect to data of bounding boxes detected from a first frame image illustrated in FIG. 12, it is assumed that a first bounding box 240 and a third bounding box 220 corresponding to a head area are detected, and a second bounding box 250 and a fourth bounding box 230 corresponding to a body area are acquired.

Referring to the illustration, there is an area where the first bounding box 240 corresponding to the head overlaps the second bounding box 250 corresponding to the body. In this case, the object detection apparatus may consider that the body corresponding to the second bounding box 250 and the head corresponding to the first bounding box 240 correspond to those of the same person object, and change an identification value of the second bounding box 250 to an identification value of the first bounding box 240.

Meanwhile, there is an area where the third bounding box 220 corresponding to the head overlaps both the second bounding box 250 and the fourth bounding box 230 corresponding to the body.

According to one embodiment of the invention, the object detection apparatus may change the identification value of one of the second bounding box 250 and the fourth bounding box 230, which more overlaps the third bounding box 220 than the other, to the identification value of the second bounding box.

According to another embodiment of the invention, the object detection apparatus may not change the identification value of one of the second bounding box 250 and the fourth bounding box 230, which is already assigned the identification value equal to that of the bounding box corresponding to the head.

According to yet another embodiment of the invention, the object detection apparatus may not change the identification value of one of the second bounding box 250 and the fourth bounding box 230, which is detected from the same frame image as the fifth bounding box having the identification value equal to that of the third bounding box 220. This is because, for example, when the identification values of the third bounding box 220 corresponding to the head and the fifth bounding box corresponding to the body are equal, and the fourth bounding box 230 and the fifth bounding box are simultaneously detected from a specific frame image, the body corresponding to the fourth bounding box 230 and the body corresponding to the fifth bounding box may correspond to those of different person objects.

FIG. 13 illustrates an algorithm for assigning identification values to a plurality of bounding boxes according to one embodiment of the invention.

Hereinafter, it will be described how to unify identification values of bounding boxes corresponding to the head and body of the same person when a person's head and a person's body are independently detected in order to detect a person object according to one embodiment of the invention.

According to one embodiment of the invention, the object detection apparatus may acquire data of bounding boxes detected from each of frame images, and match bounding boxes corresponding to the body with bounding boxes corresponding to the head. Subsequently, the object detection apparatus may perform the steps to be described below with respect to all the bounding boxes corresponding to the body.

First, the object detection apparatus may acquire a ratio of frame images where a target head bounding box is contained in a target body bounding box to frame images from which the target head bounding box is detected. When the ratio is 5% or less, the object detection apparatus may exclude the target head bounding box from a list of candidates to be matched with the body bounding box.

According to one embodiment of the invention, when the head bounding box is contained in the body bounding box, a ratio of the size of an area where the body bounding box and the head bounding box overlap to the size of the head bounding box may preferably be 80% or more. However, it should be noted that the numerical value of the size of the area according to some embodiments of the invention is not limited thereto.

Thereafter, the object detection apparatus may sort a list of one or more head bounding boxes that are not excluded from the list of candidates to be matched with the body bounding box, in descending order of the above ratio. Further, the object detection apparatus may acquire a list of body bounding boxes that are already linked to all the head bounding boxes on the list of candidates to be matched with the body bounding box.

Subsequently, the object detection apparatus may sequentially perform a body link operation to be described below with respect to the list of one or more head bounding boxes that are not excluded from the list of candidates to be matched with the body bounding box.

It is assumed that body bounding boxes sequentially acquired from a list of all body bounding boxes are referred to as A, and body bounding boxes sequentially acquired from body bounding boxes that are already linked to a specific head bounding box are referred to as B. According to one embodiment of the invention, when there is at least one body bounding box B for which a ratio of frame images containing B to frame images containing A (or a ratio of frame images containing A to frame images containing B) is 10% or more, it is less probable that the body bounding boxes A and B correspond to the same person. In this case, the object detection apparatus may repeatedly perform the above operation with respect to the next head bounding box on the list of candidates to matched with the body bounding box.

According to an alternative embodiment of the invention, when there is no body bounding box B for which the ratio of frame images containing B to frame images containing A (or the ratio of frame images containing A to frame images containing B) is 10% or more, the object detection apparatus may change the identification value of the body to be equal to that of the head.

The above-described apparatus may be implemented with hardware components, software components, and/or a combination of the hardware components and software components. For example, the apparatus and components described in connection with the embodiments of the invention may be implemented with one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may run an operating system (OS) and one or more software applications executed on the operating system. Further, in response to the execution of the software, the processing device may access, store, operate, process, and create data. For the convenience of understanding, it is described in some cases that one processing device is used. However, those skilled in the art would understand that the processing device may include a plurality of pieces and/or types of processing elements. For example, the processing device may include a plurality of processors, or include a single processor and a single controller. Further, the processing device may have a different processing configuration such as a parallel processor.

The software may include computer programs, codes, instructions, or a combination of the foregoing, and may configure the processing device to operate as desired or instruct the processing device in an independent or collective manner. The software and/or data may be permanently or temporarily embodied in some type of machine, component, physical equipment, virtual equipment, computer storage medium or device, or transmitted signal wave, so as to be interpreted by the processing device or provide instructions or data to the processing device. The software may be distributed on computer systems connected to a network, and stored or executed in a distributed manner. The software and data may be stored on one or more computer-readable recording media.

The method according to the embodiments of the invention may be implemented in the form of program instructions that can be executed by various computer components, and stored on a computer-readable recording medium. The computer-readable recording medium may include program instructions, data files, and data structures, separately or in combination. The program instructions stored on the computer-readable recording medium may be specially designed and configured for the embodiments of the invention, or may also be known and available to those skilled in the computer software field. Examples of the computer-readable recording medium include the following: magnetic media such as hard disks, floppy disks, and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be configured to operate as one or more software modules to perform the operations of the embodiments of the invention, and vice versa.

Although the embodiments of the invention have been described above in terms of the limited embodiments and drawings, various modifications and changes may be made from the above description by those skilled in the art. For example, appropriate results may be achieved even if the described techniques are performed in a different order from the described method, and/or the components of the described system, structure, apparatus, circuit, and the like are coupled or combined, or replaced with other components or equivalents, in a different form from the described method.

Therefore, other implementations, other embodiments, and equivalents of the appended claims will also fall within the scope of the claims.

What is claimed is:

1. An object detection method performed by an object detection apparatus, the object detection method comprising the steps of:

acquiring a plurality of frame images;
detecting a first bounding box of a first object and a second bounding box of a second object from a first frame image;
assigning a first identification value to the first bounding box, and assigning a second identification value to the second bounding box;
generating a virtual bounding box of the first object in a second frame image;
assigning the first identification value to a third bounding box of the first object detected from the second frame image, on the basis of a size of an area where the third bounding box overlaps the virtual bounding box; and
changing the second identification value to the first identification value on the basis of a size of an area where the first bounding box overlaps the second bounding box,
wherein in response to a sixth bounding box of a fourth object having an area overlapping the first bounding box being detected from the first frame image, an identification value of one of the second and sixth bounding boxes, which is detected from the same frame image as a seventh bounding box assigned an identification value equal to the first identification value, is not changed in the step of changing the second identification value to the first identification value,
wherein the seventh bounding box is capable of being detected from a frame image captured later than the first frame image, and
wherein the second identification value is changed to the first identification value with reference to a ratio of frame images containing the first bounding box that overlaps the second bounding box at or above a predetermined level to frame images from which the first bounding box is detected, or a ratio of frame images containing the second bounding box that overlaps the first bounding box at or above a predetermined level to frame images from which the second bounding box is detected.

2. The object detection method of claim 1, wherein the step of detecting the first bounding box and the second bounding box comprises the step of:

acquiring vertex coordinates of the first bounding box using center coordinates, a horizontal length, and a vertical length of the first bounding box, and acquiring vertex coordinates of the second bounding box using center coordinates, a horizontal length, and a vertical length of the second bounding box.

3. The object detection method of claim 1, wherein the step of generating of the virtual bounding box comprises the step of:

generating a first virtual bounding box on the basis of the first bounding box, and mapping the first virtual bounding box to the third bounding box.

4. The object detection method of claim 3, wherein the step of mapping the first virtual bounding box to the third bounding box comprises the steps of:

generating a second virtual bounding box in a third frame image in response to not detecting the third bounding box; and
mapping the second virtual bounding box to a fourth bounding box of the first object detected from the third frame image, and
wherein the step of assigning the first identification value to the third bounding box comprises the step of:
assigning the first identification value to the fourth bounding box of the first object detected from the third frame image, on the basis of a size of an area where the fourth bounding box overlaps the second virtual bounding box.

5. The object detection method of claim 1, wherein the step of assigning the first identification value to the third bounding box comprises the step of:

assigning the first identification value to the third bounding box in response to determining that the size of the area where the third bounding box overlaps the virtual bounding box is not less than a reference value.

6. The object detection method of claim 1, wherein the step of changing the second identification value to the first identification value comprises the step of:

changing the second identification value to the first identification value in response to determining that the size of the area where the first bounding box overlaps the second bounding box is not less than a reference value.

7. The object detection method of claim 6, wherein the step of detecting the second bounding box comprises the step of detecting a fifth bounding box of a third object, wherein the step of assigning the second identification value to the second bounding box comprises the step of assigning a third identification value to the fifth bounding box, and wherein the step of changing the second identification value to the first identification value comprises the step of changing the third identification value to the first identification value in response to determining that an area where the first bounding box overlaps the fifth bounding box is larger than the area where the first bounding box overlaps the second bounding box.

* * * * *